United States Patent [19]

Blumenkranz et al.

[11] 3,850,459
[45] Nov. 26, 1974

[54] REINFORCED PLASTIC PIPE FITTINGS

[75] Inventors: James J. Blumenkranz, Hollywood; Charles W. Putzier, Los Angeles, both of Calif.

[73] Assignee: R & G Sloane Manufacturing Company, Inc., Los Angeles County, Calif.

[22] Filed: July 27, 1973

[21] Appl. No.: 383,281

Related U.S. Application Data

[63] Continuation of Ser. No. 148,368, June 1, 1971, abandoned.

[52] U.S. Cl................... 285/156, 285/179, 285/417, 285/423
[51] Int. Cl.............................................. F16l 47/00
[58] Field of Search .......... 285/152, 155, 156, 179, 285/238, 260, 417, 423

[56] References Cited
UNITED STATES PATENTS

| | | | |
|---|---|---|---|
| 2,670,224 | 2/1954 | Markl .................................. 285/210 |
| 2,735,699 | 2/1956 | Chadbourne ........................ 285/71 |
| 2,769,647 | 11/1956 | Harstick et al. ..................... 285/31 |
| 3,108,826 | 10/1963 | Black ................................... 285/423 X |
| 3,381,982 | 5/1968 | Elek .................................... 285/423 X |
| 3,498,648 | 3/1970 | Hallesy ................................ 285/343 |
| 3,610,288 | 10/1971 | Carr .................................... 285/417 X |
| 3,614,137 | 10/1971 | Jacobson ............................. 285/417 X |

FOREIGN PATENTS OR APPLICATIONS

| | | | |
|---|---|---|---|
| 933,560 | 8/1963 | Great Britain ...................... 285/423 |
| 1,014,803 | 2/1958 | Germany ............................. 285/417 |

*Primary Examiner*—Jordan Franklin
*Assistant Examiner*—Wayne L. Shedd
*Attorney, Agent, or Firm*—Tipton D. Jennings

[57] ABSTRACT

Plastic pipe fittings are reinforced by selectively thickening the walls of the fittings in the areas of greatest stress, and by thinning the fitting walls where permissible, thereby resulting in an economical utilization of the plastic material from which they are fabricated. In the case of tees and elbows, they are selectively reinforced by increasing the wall thickness adjacent the inner ends of the sockets thereof and in the crotch and central body areas thereof. The thickness of the reinforced fittings is determined, both theoretically and empirically, by relating the wall thickness of the fitting, at the points of greatest stress, to the wall thickness of the pipe to be coupled to the fitting.

17 Claims, 3 Drawing Figures

PATENTED NOV 26 1974

3,850,459

INVENTORS
JAMES J. BLUMENKRANZ
CHARLES W. PUTZIER

BY Martha L. Ross
AGENT

REINFORCED PLASTIC PIPE FITTINGS

This is a continuation of application Ser. No. 148,368, filed June 1, 1971, now abandoned.

BACKGROUND OF THE INVENTION

The present invention relates to reinforced plastic fittings suitable for use in piping systems for the transport of fluids under pressure. More particularly, the invention relates to such reinforced plastic pipe fittings which are constructed for the most economical utilization of the plastic material from which they are fabricated.

Heretofore, plastic pipe fittings, such as tees, elbows and couplings, have been patterned after their metal counterparts, in that they have been of essentially uniform wall thickness throughout the body of the fitting. It has been recognized that, because of the geometry of the fittings, it is not possible to accurately mathematically analyze the distribution of stresses in the fitting body when it is subjected to internal pressure. By observation of the mode of failure of fittings pressurized to their failure points, it has been possible to determine that the areas of maximum stress are at points adjacent the inner ends of the sockets in the couplings, and, in the case of tees and elbows, are at the points of intersection of the branch openings of the fittings, and in the unsupported central areas where the fitting walls are subjected to bending stresses as well as or instead of hoop stresses.

Additionally, in a plastic piping system in which the pipe is solvent-cemented or otherwise secured within the sockets of the plastic fittings, the joints are subjected to a number of forces. First, internal pressure tends to push the pipe out of the socket, and thus the joint is subjected to shearing forces. The ability of the joint to resist these shearing forces depends on the area of the pipe and fittings in cemented or bonded contact, and on the unit shearing strength of the cemented or bonded joint. This unit shearing strength, in the case of a solvent-cemented joint, depends on the nature of the cement, the closeness of the uncemented fit between the pipe and the fitting and, most important of all, on the time elapsed after the cementing.

Secondly, internal pressure tends to expand the pipe in the fitting socket. Thirdly, internal pressure, acting over the central unsupported area of a tee or elbow fitting, tends to bulge the sides of the fitting. If the wall thickness of the central body area of the fitting is substantially thinner than the combined thickness of the pipe wall and the fitting socket wall, the expansion of the fitting will be greater in the central body area than in the area adjacent the inner end of the socket, and this will result in peeling forces being exerted between the pipe and the fitting socket. As many cemented or bonded joints between two pieces of plastic have relatively little resistance to peeling, the joint will tend to separate. This separation will admit the pressurized fluid within the piping system to the space produced between the pipe and fitting. In a conventionally designed plastic fitting, where the fitting socket wall is the same thickness as or thinner than the fitting body wall, thermoplastic creep (continued deformation under constant load) will take place. This will result in the peeling progressing outwardly from the inner end of the socket area to the outer end thereof, until the peel area reaches the outer end of the socket and joint failure has taken place.

From the foregoing description, it is apparent that, in many cases, conventional plastic fittings of essentially uniform wall thickness throughout the body thereof, have been subject to many disadvantages when used in piping systems for the transport of fluids under relatively high pressure.

SUMMARY OF THE INVENTION

The reinforced plastic fittings of the present invention are not subject to the disadvantages of conventional plastic fittings of substantially uniform wall thickness when used in piping systems for the transport of fluids under relatively high pressure. Also, the reinforced plastic fittings of the present invention are constructed for the most economical utilization of the plastic material from which they are fabricated.

In accordance with the present invention, plastic fittings are provided with an increased wall thickness in the areas thereof adjacent the inner ends of the sockets therein that are adapted to receive the complementary ends of pipes or other conduits. In this manner, an adequate wall thickness is provided at the inner end of the fitting socket area to resist both expansion forces on the pipe within the socket and peeling forces.

In the case of tee or elbow fittings, they are reinforced in the following areas:

1. The wall thickness is increased at the point of intersection of the branch sockets or the crotch of the fitting;
2. the socket areas are of adequate length so as to provide an adequate area of material in shear in the cemented or bonded joint with a pipe end or the like;
3. the wall thickness of the fitting is increased in the central body area of the fitting to resist bulging; and
4. the wall thickness is increased in the area of the fitting adjacent the inner ends of the sockets and the central body area to resist expansion and peeling forces.

The wall thicknesses of the fittings of this invention are determined, both theoretically and empirically, by relating them to the wall thickness of the pipe or conduit with which each fitting is to be used. As an illustrative example, the outer diameter-to-wall thickness ratio of a fitting at a point adjacent to the inner end of a socket therein, is made equal to or of lower value than the outer diameter-to-wall thickness ratio of the pipe to be received within the socket, thereby assuring adequate strength at this point of the fitting to resist expansion and/or peeling forces. In the case of tee and elbow fittings, it has been found empirically that the wall thickness in the crotch area and in the unsupported central body area will be adequately reinforced if it is about 1.4 to 1.6 times the wall thickness of the fitting at the points adjacent the inner ends of the sockets therein. These reinforcements to the fittings can be achieved by selectively making the outer surface of the fittings eccentric with respect to certain portions of the sockets therein.

In accordance with the purposes of the invention, as embodied and broadly described herein, the reinforced plastic fittings of this invention are designed for the transport of fluid under pressure and comprise a wall defining a first socket adapted to receive the end portion of a plastic pipe in mating relationship therein, said wall having a first thickness ($t_f$) adjacent to the inner end of said first socket, the minimum value of said first thickness being determined by the formula:

$$t_f = D_p/[(D_p/t_p) - 2]$$

where $D_p$ equals the outer diameter of said plastic pipe; $t_p$ equals the wall thickness of said plastic pipe; a branch socket having a longitudinal axis extending at an angle to the longitudinal axis of said first socket; a crotch area at the point of intersection of said sockets, said crotch area having a crotch wall thickness that is approximately 1.4 to 1.6 times greater than said first wall thickness; said first wall thickness being determined at a point transversely aligned with said crotch area; the outer surface of said first socket wall viewed at the crotch area being eccentric with respect to the longitudinal axis of said first socket.

DESCRIPTION OF THE PREFERRED EMBODIMENTS

Figure 1:
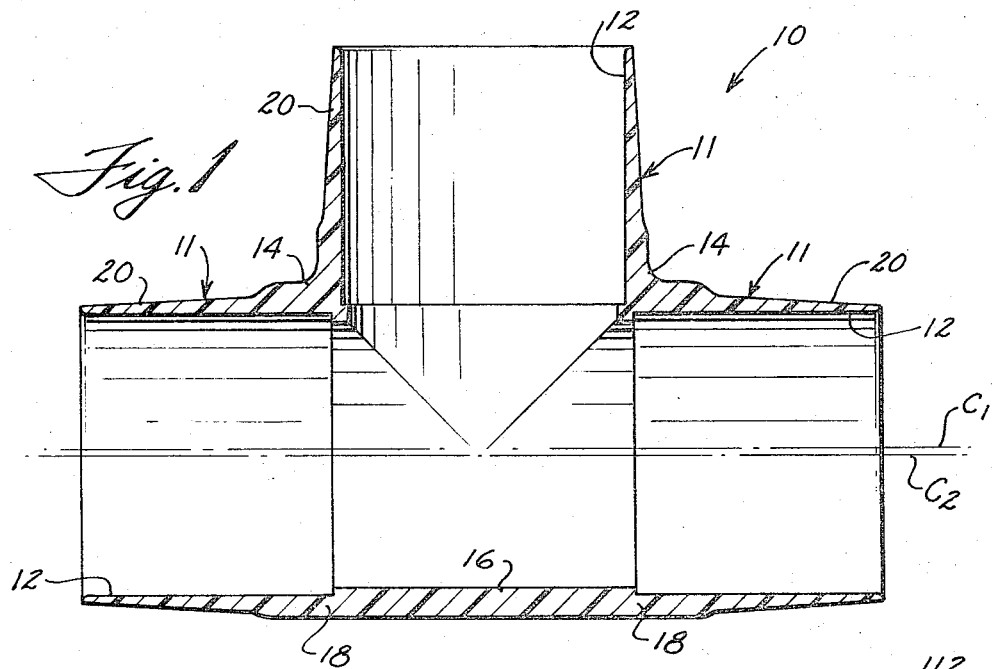
FIG. 1 is a side elevational view in section of a "tee" fitting formed in accordance with the principals of the present invention.

As shown in FIG. 1, a tee fitting 10 of any suitable plastic material formed in accordance with the present invention comprises three branches 11 with sockets 12 extending from the ends of the branches to the center portion thereof. The fitting 10 is reinforced by making it thicker at the intersection of the branch sockets or at the crotch 14 of the fitting, in the central body area 16 of the fitting, and at the points 18 adjacent the inner ends of the sockets 12.

As viewed in FIG. 1, the longitudinal axis of the vertical branch socket 12 extends at an angle, here being a right angle, to the longitudinal axis of each of the horizontal sockets 12.

In accordance with the present invention, this reinforcment is accomplished by a combined theoretical and empirical approach to the design or construction of the tee fitting 10, wherein the wall thicknesses of the fitting 10 are related to the wall thicknesses of pipes or other conduits to be inserted within the sockets 12. In the case of thermoplastic pipe, for example, the following expression is used to relate the pressure rating (P), the allowable hoop stress (S), the outside diameter (D) and the wall thickness (t):

$$2S/P = (D/t) - 1$$

(commonly known as the ISO equation)

From this equation, it is apparent that the pressure rating (P) of any size of pipe, for a given value of S, will be constant if the D/t ratio is maintained. The lower the D/t ratio, the higher the pressure rating.

In a thermoplastic fitting, the D/t ratio at a point adjacent the inner end of each socket nearest the central body area of the fitting, which is the maximum depth to which the plastic pipe will penetrate when inserted within a fitting socket, must be equal to or of lower numerical value than the D/t ratio of the pipe to insure adequate strength at this point to resist expansion and/or peeling forces. The minimum wall thickness of the fitting at a point adjacent the inner end of a socket, therefore, may be calculated as follows:

$$\frac{D_p}{t_p} = \frac{\text{outer diameter of fitting}}{\text{thickness of fitting}} = \frac{D_p + 2t_f}{t_f}$$

Thus, $t_f = D_p/[(D_p t_p) - 2]$ where:

$D_p$ = outer diameter of the thermoplastic pipe, and
$t_p$ = wall thickness of the thermoplastic pipe.

As an illustrative example, if $D_p/t_p = 21$ (one example that is in production for thermoplastic pipe), then $t_f = D_p/19$.

Based on the above calculations, the wall thicknesses of the tee fitting 10 at the points 18 may be readily calculated by relating them to the wall thicknesses and outer diameter of the pipe to be received within the sockets 12. It has been found empirically that the wall thickness in the crotch area 14 of the fitting should be thicker than the wall thickness at the transversely diametrically aligned points 18 for the purpose of adequately reinforcing the fitting in this area. As an example, it has been found that the wall thickness in the crotch area 14 should be approximately 1.6 times greater than the wall thickness at the points 18 to adequately resist expansion and/or peeling forces generated by fluid under pressure within the fitting. This differential wall thickness between the points 18 and the crotch portions 14 can be accomplished by making the outer surface of the fitting in these areas eccentric with respect to the adjacent socket areas. As shown in FIG. 1, therefore, the outer surfaces of the fitting 10 adjacent the crotch areas and points 18 have a center axis $C_1$ which is eccentric with respect to the center axis $C_2$ of the sockets 12. In this manner, the fitting 10 can be readily molded or otherwise formed with a larger wall thickness at the crotch portions 14 than at the transversely aligned points 18 adjacent the inner ends of the sockets 12.

The central body area 16 of the fitting 10 is also reinforced to resist bulging caused by fluid under pressure within the fitting. The wall thickness of the central body area 16 preferably is also about 1.6 to 2.2 times greater than the wall thickness at the points 18 and thus is approximately equal to or greater than the wall thickness at the crotch areas 14. By so reinforcing the fitting 10, it will adequately resist expansion and peeling forces caused by fluid under pressure within the fitting and thus prevent joint failure or leakage between the fitting and the pipe or pipes mounted in the sockets 12 and joined to the fitting.

In order to economically utilize the plastic material from which the fitting 10 is molded or otherwise formed, the outer surfaces 20 of all the branches 11 of the fitting 10 are preferably tapered inwardly from the reinforced areas toward the outer end of each branch of the fitting. Accordingly, the fitting 10 is provided with thinner wall thicknesses in the areas that do not have to be reinforced against expansion or peeling forces. The tapered outer surfaces 20 terminate at the outer end of each branch 11 in a thickness which is adequate for the structural integrity of the fitting, for example, approximately one-tenth of an inch. As a further illustrative example, the length of the reinforced fitting areas 14 and 18 may be approximately one-sixth to one-fourth of the total length of the branches of the fitting, depending on the diameter of the sockets. Specifically, if the length of a socket is 6 inches, the length of the reinforced wall area at the crotch 14 and at the corresponding points 18 may be approximately 1 inch for sockets with a diameter of 3 or 4 inches, or approximately 1¼ inches for sockets with a diameter of 6 or 8 inches.

Figure 2:
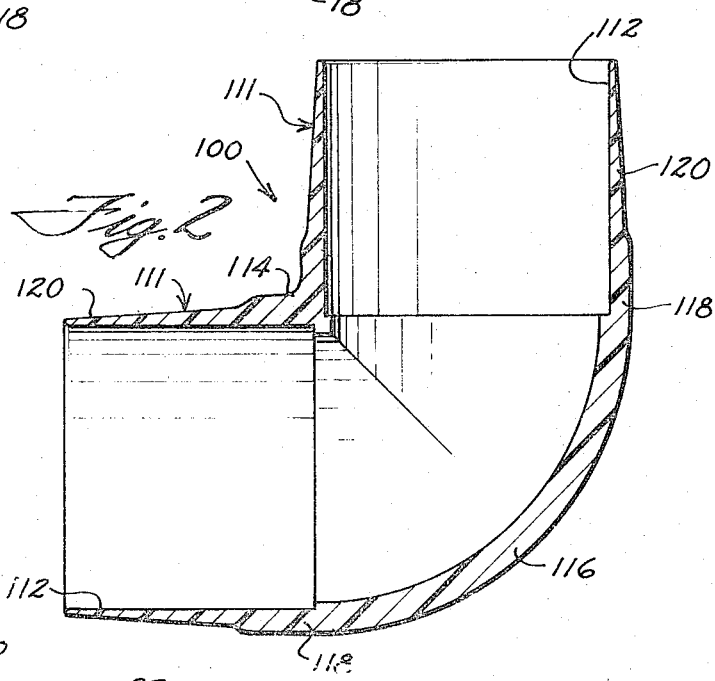
FIG. 2 is a side elevational view in section of an "ell" fitting formed in accordance with the present invention.

The elbow or ell fitting 100 shown in FIG. 2 may be reinforced in substantially the same manner as the tee fitting 10 as shown in FIG. 1. The ell fitting 100 comprises two branches 111 with a pair of sockets 112; a reinforced crotch area 114; a reinforced, curved central body area 116; and reinforced areas 118 adjacent the inner ends of the sockets 112. As viewed in FIG. 2, the longitudinal axis of the vertical branch socket 112 extends at an angle, here being a right angle, to the longitudinal axis of the horizontal socket 112.

The wall thickness of the fitting 100 at the points 118 may be computed, with respect to the wall thickness of the pipe to be received within the sockets 112, in the same manner as the wall thickness at the points 18 of the fitting 10, as hereinbefore described. It has been found empirically that the ell fitting 100 may be adequately reinforced against expansion and peeling forces at the crotch area 114 and the central body area 116 by making the wall thickness in the crotch area approximately 1.4 times the wall thickness at the transversely (diametrically) aligned points 118 and by making the wall thickness in the central body area approximately 1.4 to 2.2 times the wall thickness at the points 118. Like the tee fitting 10 shown in FIG. 1, the ell fitting 100 is also preferably provided with tapered outer surfaces 120 extending from the reinforced areas to the outer ends of each of the branches 111 of the fitting, for the purpose of conserving plastic material and providing reinforcement of the fitting only in the areas where it is necessary, thereby economically utilizing the plastic material from which the fitting 100 is made without affecting its structural integrity.

Figure 3:
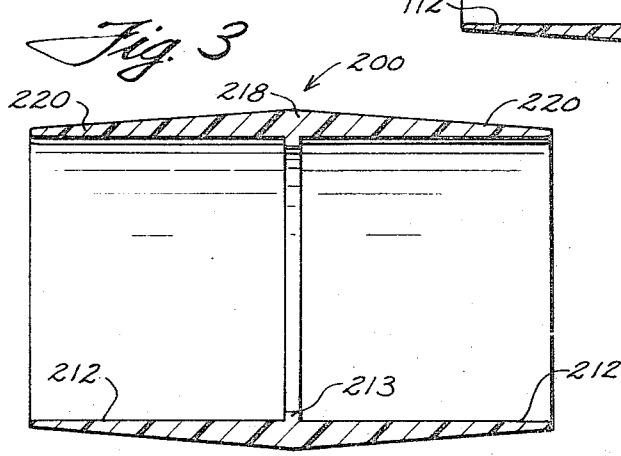
FIG. 3 is a side elevational view in section of a coupling.

FIG. 3 discloses a coupling 200 formed of any suitable plastic material. The coupling 200 comprises axially aligned sockets 212 which terminate at an inwardly extending annular flange 213 at the central portion of the fitting. The wall thickness of the coupling 200 at the central portion 218 adjacent the flange 213, which is subject to maximum stress, may be computed by relating it to the wall thickness of the pipe to be inserted within the sockets 212, through the use of the calculations hereinbefore described with respect to the tee fitting 10. The wall thickness of the coupling 200 preferably is a maximum at the point 218 adjacent the center flange 213, and the outer walls 220 thereof taper inwardly toward the outer end of the coupling for the purpose of reducing the amount of plastic material in the areas of the coupling that do not require reinforcement.

We claim:

1. A plastic pipe fitting designed for the transport of fluid under pressure comprising:
    a. a wall defining a first socket adapted to receive the end portion of a plastic pipe in mating relationship therein,
        1. said wall having a first thickness ($t_f$) adjacent to the inner end of said first socket,
        2. the minimum value of said first thickness being determined by the formula:

$$t_f = D_p/[(D_p/t_p) - 2]$$

where:
    $D_p$ = outer diameter of said plastic pipe; $t_p$ = wall thickness of said plastic pipe;
    b. a branch socket having a longitudinal axis extending at an angle to the longitudinal axis of said first socket;
    c. a crotch area at the point of intersection of said sockets, said crotch area having a crotch wall thickness that is approximately 1.4 to 1.6 times greater than said first wall thickness;
    d. said first wall thickness being determined at a point transversely aligned with said crotch area;
    e. the outer surface of said first socket wall viewed at the crotch area being eccentric with respect to the longitudinal axis of said first socket.

2. The pipe fitting of claim 1 wherein said fitting is a tee fitting having a central body area connecting said sockets, said central body area having a body wall thickness that is approximately 1.6 to 2.2 times greater than said first wall thickness.

3. The pipe fitting of claim 2 wherein the outer diameter to first wall thickness ratio of the first socket is substantially equal to the outer diameter to wall thickness ratio of the pipe to be received in said first socket.

4. The pipe fitting of claim 2 wherein the outer diameter to first wall thickness ratio of the first socket is less than the outer diameter to wall thickness ratio of the pipe to be received in said first socket.

5. The pipe fitting of claim 1 wherein said fitting is an elbow fitting having a central body area connecting said sockets, said central body area having a body wall thickness that is approximately 1.4 to 2.2 times greater than said first wall thickness.

6. The pipe fitting of claim 5 wherein the outer diameter to first wall thickness ratio of the first socket is substantially equal to the outer diameter to wall thickness ratio of the pipe to be received in said first socket.

7. The pipe fitting of claim 5 wherein the outer diameter to first wall thickness ratio of the first socket is less than the outer diameter to wall thickness ratio of the pipe to be received in said first socket.

8. The pipe fitting of claim 5 wherein said elbow comprises:
    a. a second wall defining said branch socket, said second wall having a first thickness ($t_f$) adjacent to the inner end of said branch socket, the minimum value of said first thickness of said second wall being determined by the formula of claim 1 with respect to the plastic pipe to be received in said branch socket;
    b. said first thickness of said second wall being determined at a point transversely aligned with said crotch area;
    c. the outer surface of said branch socket wall viewed at the crotch area being eccentric with respect to the longitudinal axis of said branch socket.

9. The pipe fitting of claim 8 wherein the outer diameter to first thickness ratio of the second socket is substantially equal to the outer diameter to wall thickness ratio of the pipe to be received in said second socket.

10. The pipe fitting of claim 2 wherein said tee further comprises:
    a. a second wall defining said branch socket, said angle being substantially a right angle;

b. a third wall defining a third socket coaxial with said first socket and at a right angle to said branch socket, said third wall having a first thickness ($t_f$) adjacent to the inner end of said third socket, the minimum value of said first thickness of said third wall being determined by the formula of claim 1 with respect to the plastic pipe to be received in said third socket;

c. a second crotch area at the point of intersection of said branch and third sockets, said second crotch area having a crotch wall thickness that is approximately 1.4 to 1.6 times greater than the first thickness of said third wall;

d. said first thickness of said third wall being determined at a point transversely aligned with said second crotch area;

e. the outer surface of said third socket wall viewed at the second crotch area being eccentric with respect to the longitudinal axis of said third socket.

11. The pipe fitting of claim 10 wherein the outer diameter to first thickness ratio of the third socket is substantially equal to the outer diameter to wall thickness ratio of the pipe to be received in said third socket.

12. The pipe fitting of claim 1 further comprising a second thickness for said first socket wall adjacent to the outer end of the first socket substantially less than said first thickness, the outer surface of said first socket wall being tapered inwardly toward said other end.

13. The pipe fitting of claim 8 further comprising a second thickness for each socket wall adjacent to the outer end of each socket substantially less than the respective first thickness of each socket wall, the outer surface of each socket wall being tapered inwardly toward the outer end.

14. The pipe fitting of claim 10 further comprising a second thickness for each socket wall adjacent to the outer end of each socket substantially less than the respective first thickness of each socket wall, p. outer surface of each socket wall being tapered inwardly toward the outer end.

15. The plastic pipe fitting of claim 1 in combination with a plastic pipe designed to fit said first socket, said pipe having an outer diameter of $D_p$ and a wall thickness of $t_p$.

16. The plastic pipe fitting of claim 8 in combination with
   a. a first plastic pipe designed to fit said first socket, said first pipe having an outer diameter of $D_p$ and a wall thickness of $t_p$ with respect to said first socket, and
   b. a second pipe designed to fit said branch socket, said second pipe having an outer diameter of $D_p$ and a wall thickness of $t_p$ with respect to said branch socket.

17. The plastic pipe fitting of claim 10 in combination with
   a. a first plastic pipe designed to fit said first socket, said first pipe having an outer diameter of $D_p$ and a wall thickness of $t_p$ with respect to said first socket, and
   b. a second plastic pipe designed to fit said third socket, said second pipe having an outer diameter of $D_p$ and a wall thickness of $t_p$ with respect to said third socket.

* * * * *

UNITED STATES PATENT OFFICE
CERTIFICATE OF CORRECTION

Patent No. 3,850,459          Dated November 26, 1974

Inventor(s) James J. Blumenkranz and Charles W. Putzier

It is certified that error appears in the above-identified patent and that said Letters Patent are hereby corrected as shown below:

Claim 14, line 4, "p." should be --the--.

Signed and sealed this 18th day of February 1975.

(SEAL)
Attest:

RUTH C. MASON
Attesting Officer

C. MARSHALL DANN
Commissioner of Patents
and Trademarks